(12) United States Patent
Tabata et al.

(10) Patent No.: US 11,718,141 B2
(45) Date of Patent: Aug. 8, 2023

(54) STABILIZER SYSTEM FOR VEHICLE

(71) Applicant: Toyota Jidosha Kabushiki Kaisha, Toyota (JP)

(72) Inventors: Masaaki Tabata, Nagoya (JP); Kazuyuki Murata, Toyota (JP); Masashi Yamamoto, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/224,500

(22) Filed: Apr. 7, 2021

(65) Prior Publication Data
US 2021/0379957 A1 Dec. 9, 2021

(30) Foreign Application Priority Data
Jun. 9, 2020 (JP) ................. 2020-100249

(51) Int. Cl.
*B60G 21/073* (2006.01)
*B60G 17/015* (2006.01)
(Continued)

(52) U.S. Cl.
CPC ......... *B60G 21/073* (2013.01); *B60G 17/015* (2013.01); *B60G 21/055* (2013.01);
(Continued)

(58) Field of Classification Search
CPC .............. B60G 17/015; B60G 17/0162; B60G 21/055; B60G 21/0551; B60G 21/06;
(Continued)

(56) References Cited

U.S. PATENT DOCUMENTS 6,179,310 B1* 1/2001 Clare ................. B60G 17/0152
280/5.506
7,240,906 B2* 7/2007 Klees ..................... B60G 21/10
280/5.502

(Continued)

FOREIGN PATENT DOCUMENTS

JP 2000-177354 A 6/2000
JP 2009-023650 A 2/2009
(Continued)

OTHER PUBLICATIONS

Description Translation for WO 2010/109672 from Espacenet (Year: 2010).*

*Primary Examiner* — Karen Beck
*Assistant Examiner* — Daniel M. Keck
(74) *Attorney, Agent, or Firm* — Dinsmore & Shohl LLP

(57) ABSTRACT

In each of a first stabilizer device and a second stabilizer device, a stabilizer bar is supported by one or more cylinders, a communication passage via which two fluid chambers of each cylinder are connected is provided, and an opening-closing valve is disposed in the communication passage such that an inter-fluid-chamber communication state where the two fluid chambers communicate with each other and an inter-fluid-chamber shutoff state where the two fluid chambers are shut off from each other are selectively established. Hereby, a vehicle body roll restraining effect is achieved in the inter-fluid-chamber shutoff state while the vehicle body roll restraining effect is cancelled in the inter-fluid-chamber communication state. A linkage mechanism by which those two states of each of the stabilizer devices are changed in conjunction with each other is provided.

18 Claims, 6 Drawing Sheets

(51) Int. Cl.
  *B60G 21/055* (2006.01)
  *B60G 17/016* (2006.01)
  *B60G 21/06* (2006.01)
(52) U.S. Cl.
  CPC ............. *B60G 2202/135* (2013.01); *B60G 2204/8304* (2013.01); *B60G 2600/26* (2013.01)
(58) Field of Classification Search
  CPC ........... B60G 21/073; B60G 2202/135; B60G 2202/24; B60G 2202/41; B60G 2202/413; B60G 2202/414; B60G 2202/42; B60G 2204/122; B60G 2204/1222; B60G 2204/1224; B60G 2204/8304; B60G 2400/10; B60G 2600/18; B60G 2600/26; B60G 2204/20; B60G 2204/201; B60G 2204/202; B60G 2204/41062; B60G 2204/422
  See application file for complete search history.

(56) References Cited

U.S. PATENT DOCUMENTS

| | | | |
|---|---|---|---|
| 2005/0225048 A1* | 10/2005 | Kasamatsu | B60G 17/056 280/124.16 |
| 2006/0212199 A1* | 9/2006 | Urababa | B60G 21/0555 701/38 |
| 2009/0020966 A1 | 1/2009 | Germain | |
| 2016/0200164 A1* | 7/2016 | Tabata | B60G 21/073 280/5.508 |
| 2020/0180386 A1* | 6/2020 | Tabata | B60G 17/0162 |
| 2022/0001715 A1* | 1/2022 | Murata | B60G 21/026 |

FOREIGN PATENT DOCUMENTS

| | | | | |
|---|---|---|---|---|
| JP | 2009-029257 A | | 2/2009 | |
| JP | 2013028204 A | * | 2/2013 | |
| JP | 2016-130044 A | | 7/2016 | |
| WO | 2004/080735 A1 | | 9/2004 | |
| WO | WO-2010109672 A1 | * | 9/2010 | ......... B60G 17/0152 |

* cited by examiner

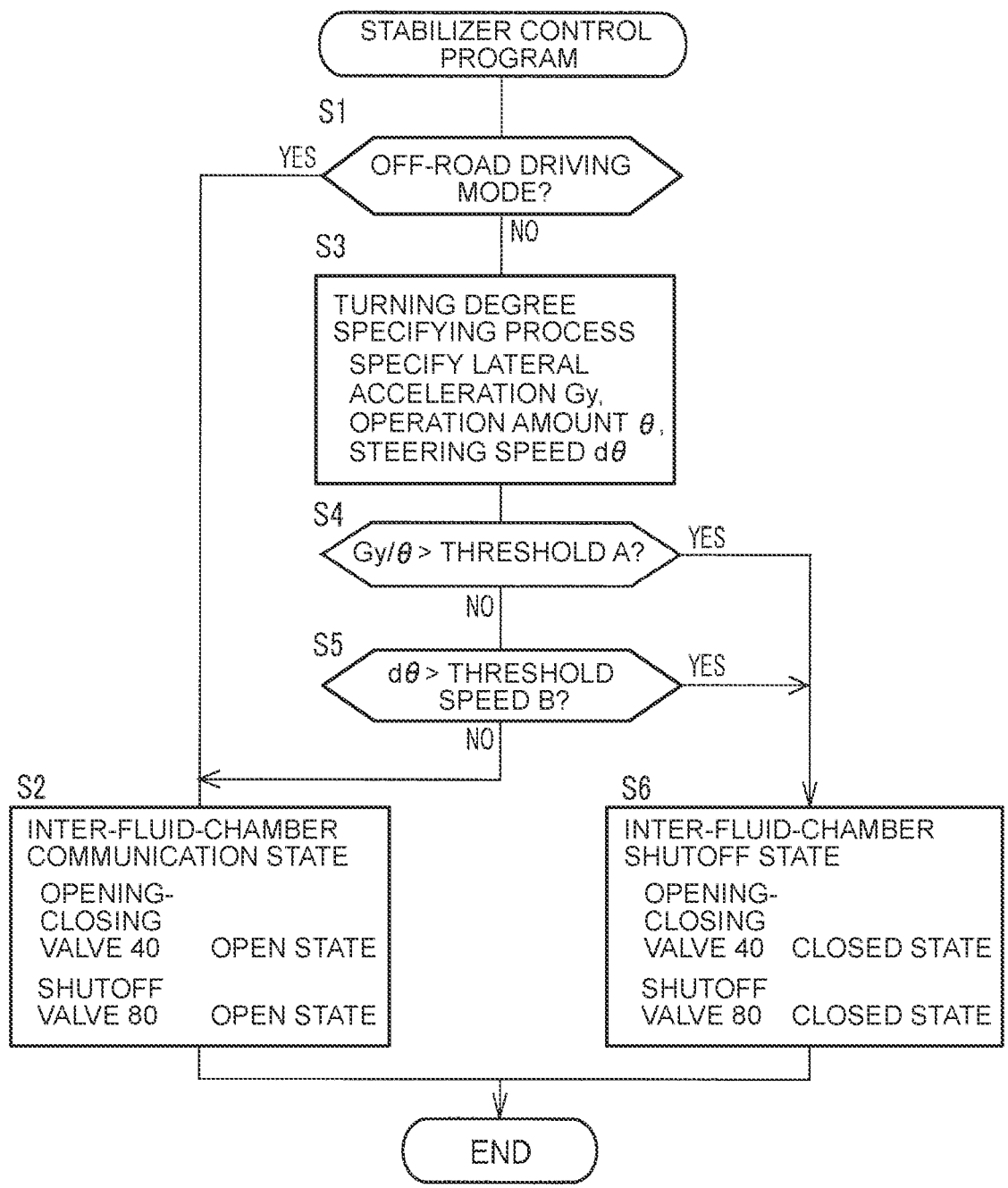

STABILIZER SYSTEM FOR VEHICLE

CROSS-REFERENCE TO RELATED APPLICATION

This application claims priority to Japanese Patent Application No. 2020-100249 filed on Jun. 9, 2020, incorporated herein by reference in its entirety.

BACKGROUND

1. Technical Field

The present disclosure relates to a stabilizer system to be provided in a vehicle.

2. Description of Related Art

A stabilizer system is provided in a vehicle so as to restrain roll of the vehicle, and the stabilizer system includes a stabilizer bar as a major component. In recent years, a stabilizer system has been developed. For example, as described in Japanese Unexamined Patent Application Publication No. 2009-23650 (JP 2009-23650 A), such a technique has been also examined that a vehicle body roll restraining effect achieved by a stabilizer bar is controlled by use of a hydraulic cylinder, so that a control for the roll of the vehicle is made appropriate.

SUMMARY

The stabilizer system described in JP 2009-23650 A, that is, a stabilizer system including a stabilizer device to which a hydraulic cylinder is applied still has a lot of room for improvement. By making some sort of improvement, it is possible to improve the utility of the stabilizer system. The present disclosure has been accomplished in consideration of such circumstances, and an object of the present disclosure is to provide a highly utilized stabilizer system for a vehicle.

In order to achieve the above object, a stabilizer system for a vehicle in the present disclosure (hereinafter also referred to as the "stabilizer system") is a stabilizer system including a first stabilizer device provided for either one of front wheels and rear wheels and a second stabilizer device provided for the other one of the front wheels and the rear wheels. Each of the first stabilizer device and the second stabilizer device includes: (a) a stabilizer bar extending in a right-left direction; (b) one or more cylinders each including a housing and a piston by which the housing is sectioned into two fluid chambers, the one or more cylinders being disposed between the stabilizer bar and a corresponding one of the wheels or between the stabilizer bar and a vehicle body in an extensible and contractible manner; (c) a communication passage via which the two fluid chambers of each of the one or more cylinders are connected to each other; and (d) an opening-closing valve disposed in the communication passage and configured to selectively establish an inter-fluid-chamber communication state where the two fluid chambers communicate with each other and an inter-fluid-chamber shutoff state where the two fluid chambers are shut off from each other. The first stabilizer device and the second stabilizer device are each configured such that a vehicle body roll restraining effect is achieved in the inter-fluid-chamber shutoff state, and the vehicle body roll restraining effect is cancelled in the inter-fluid-chamber communication state. The stabilizer system includes a linkage mechanism configured to, when the inter-fluid-chamber shutoff state is established in a main stabilizer device, establish the inter-fluid-chamber shutoff state in a following stabilizer device, the main stabilizer device being one of the first stabilizer device and the second stabilizer device, the following stabilizer device being the other one of the first stabilizer device and the second stabilizer device.

With the present disclosure, two stabilizer devices placed for the front wheels and for the rear wheels operate in conjunction with each other by the linkage mechanism. Accordingly, when one of the two stabilizer devices achieves a vehicle body roll restraining effect, the other one of them can also achieve the vehicle body roll restraining effect. Thus, a simple stabilizer system is established. Accordingly, the stabilizer system of the present disclosure is practical.

In the stabilizer system of the present disclosure, the linkage mechanism may be configured as follows. The opening-closing valve of the main stabilizer device may be an electrically controllable electromagnetic valve. The stabilizer system may include an introduction passage via which a hydraulic pressure of one of the two fluid chambers of each of the one or more cylinders of the main stabilizer device is introduced into the following stabilizer device. The opening-closing valve of the following stabilizer device may be a non-electromagnetic valve configured to operate by using, as a pilot pressure, the hydraulic pressure introduced via the introduction passage. With such a configuration, when the electromagnetic opening-closing valve of the main stabilizer device is electrically controlled, the front and rear stabilizer devices can be linked with each other in terms of presence or absence of the vehicle body roll restraining effect. Further, when the inter-fluid-chamber communication state is established, a relatively large flow rate of hydraulic fluid should be passed through the opening-closing valve. In view of this, it is necessary to employ a relatively large valve as the opening-closing valve. A relatively large electromagnetic valve is considerably expensive. Accordingly, when a non-electromagnetic valve is employed as the opening-closing valve of the following stabilizer device, the stabilizer system can be established at a relatively low cost.

In a case where a pilot pressure is introduced into the following stabilizer device, the linkage mechanism may include a non-electromagnetic selector valve by which a higher hydraulic pressure out of respective hydraulic pressures of the two fluid chambers of each of the one or more cylinders of the main stabilizer device is introduced into the following stabilizer device. With this configuration, the pilot pressure suitable for linking the two stabilizer devices with each other can be introduced into the following stabilizer device from the main stabilizer device effectively with a relatively simple configuration.

The opening-closing valve of the main stabilizer device may be a normally-closed electromagnetic valve configured to be brought into an open state by being excited. By employing the normally-closed electromagnetic valve, even when an electrical failure occurs in the stabilizer system, the vehicle body roll restraining effect of the main stabilizer device is maintained.

The one or more cylinders of either of the first stabilizer device and the second stabilizer device may each include a piston rod having a base end part connected to the piston and a distal end part extending out of the housing through one of the two fluid chambers. The housing may be connected to either of the stabilizer bar and a corresponding one of the wheels or the vehicle body, and the distal end part of the piston rod may be connected to the other one of the stabilizer bar and the corresponding one of the wheels or the vehicle body. Briefly speaking, as each of the one or more cylinders, it is possible to employ a general cylinder, that is, a cylinder configured such that a piston rod extends out only from one side of a housing (hereinafter also referred to as a "cylinder with a rod extending out from one side"). The cylinder with a rod extending out from one side has a simple structure and is inexpensive. In the meantime, a cylinder different from the cylinder with a rod extending out from one side, more specifically, a cylinder including a piston rod extending out from opposite sides of a housing (hereinafter also referred to as a "cylinder with a rod extending out from opposite sides"), in other words, a cylinder with a piston rod passing through two fluid chambers can be also employed. Due to a complicated structure, the cylinder with a rod extending out from opposite sides is more expensive than the cylinder with a rod extending out from one side. However, in the case of the cylinder with a rod extending out from opposite sides, a pressure receiving area of a piston on which the pressure of hydraulic fluid in one of two fluid chambers acts can be made equal to a pressure receiving area on which the pressure of hydraulic fluid in the other one of the two fluid chambers acts.

In a case where the cylinder with a rod extending from one side is employed, there is a difference between the outflow-inflow amount of hydraulic fluid in one of the two fluid chambers along with extension and contraction of the cylinder and the outflow-inflow amount of hydraulic fluid in the other one of the two fluid chambers. In consideration of this point, the stabilizer system may include an accumulator connected to both the communication passage of the first stabilizer device and the communication passage of the second stabilizer device so that the one or more cylinders of either of the first stabilizer device and the second stabilizer device are each extensible and contractible in the inter-fluid-chamber communication state. With this aspect where the accumulator is provided, the accumulator can be shared by the two stabilizer devices, thereby making it possible to simplify the stabilizer system. Further, in this aspect, at least either one of the communication passage of the first stabilizer device and the communication passage of the second stabilizer device may be connected to the accumulator via the introduction passage.

Meanwhile, in the case where the accumulator is provided, when the inter-fluid-chamber shutoff state is established, it is desirable to shut off the communication passage from the accumulator in order to prohibit the extension and contraction of the piston. In consideration of this point, in the aspect where the accumulator is provided, the stabilizer system may include a shutoff valve configured to close the accumulator when the first stabilizer device and the second stabilizer device are both brought into the inter-fluid-chamber shutoff state. Note that, the shutoff valve may be an electrically controllable electromagnetic valve. More specifically, the shutoff valve may be a normally-opened electromagnetic valve that is brought into a closed state by being excited. When the shutoff valve is an electromagnetic valve, the shutoff valve can be electrically operated at the same time as the opening-closing valve of the main stabilizer device. Further, by employing the normally-opened electromagnetic valve, even in a case where an electrical failure occurs, the cylinder is allowed to extend and contract when the stabilizer device is in the inter-fluid-chamber communication state.

As one example of a stabilizer device that can be employed, a two-cylinder stabilizer device may be employed as at least either one of the first stabilizer device and the second stabilizer device. That is, at least either one of the first stabilizer device and the second stabilizer device may be a two-cylinder stabilizer device configured as follows. Opposite ends of the stabilizer bar may be connected to a pair of wheel holding portions, respectively, the wheel holding portions being configured to hold right and left wheels, respectively, and vertically move relative to the vehicle body together with the wheels thus held. The two-cylinder stabilizer device may include, as the one or more cylinders, a pair of cylinders each disposed between a corresponding one of a pair of supported portions and the vehicle body such that the supported portions of the stabilizer bar are supported by the vehicle body, the supported portions being provided in right and left parts of the stabilizer bar, respectively, each of the pair of the cylinders being configured to extend and contract in accordance with a rebound operation and a bound operation of a corresponding wheel out of the right and left wheels relative to the vehicle body such that: a volume of a first fluid chamber as one of the two fluid chambers of the each of the pair of the cylinders increases at the time of the rebound operation of the corresponding wheel while the volume of the first fluid chamber decreases at the time of the bound operation of the corresponding wheel; and a volume of a second fluid chamber as the other one of the two fluid chambers of the each of the pair of the cylinders decreases at the time of the rebound operation of the corresponding wheel while the volume of the second fluid chamber increases at the time of the bound operation of the corresponding wheel. The communication passage may include: a first communication passage via which the first fluid chamber of one of the pair of the cylinders communicates with the second fluid chamber of the other one of the pair of the cylinders; a second communication passage via which the second fluid chamber of the one of the pair of the cylinders communicates with the first fluid chamber of the other one of the pair of the cylinders; and an inter-passage commutation passage via which the first communication passage and the second communication passage communicate with each other. The opening-closing valve may be disposed in the inter-passage communication passage.

The first communication passage and the second communication passage in the two-cylinder stabilizer device of the aspect can be considered as cross pipes, for example. It can be said that the two-cylinder stabilizer device of the aspect includes two hydraulic pressure systems each constituted by a corresponding one of the first communication passage and the second communication passage, and two fluid chambers of cylinders connected by the corresponding one of the first communication passage and the second communication passage. In the stabilizer device of the aspect, the inter-fluid-chamber communication state and the inter-fluid-chamber shutoff state are selectively established by control on the operation of the opening-closing valve provided in the inter-passage communication passage.

When the inter-fluid-chamber shutoff state is established, the two hydraulic pressure systems are independent from each other. Hereby, extension and contraction of each of the pair of the cylinders are restricted, so that position changes of the supported portions of the stabilizer bar, more specifically, position changes of the supported portions relative to the vehicle body are prohibited. As a result, when the vehicle body rolls, the stabilizer bar is twisted similarly to a normal stabilizer device. Reaction force to the twist acts on the right and left wheels and the vehicle body as roll restraining force, so that the roll of the vehicle body is restrained effectively.

Meanwhile, when the inter-fluid-chamber communication state is established, hydraulic fluid is allowed to generally freely flow in and out of two fluid chambers of each of the pair of the cylinders, that is, four fluid chambers. Hereby, relatively free position changes of the supported portions of the stabilizer bar are allowed along with vertical motions of the right and left wheels. As a result, generation of roll restraining force is restricted. Accordingly, it is possible to effectively absorb road-surface inputs into the right and left wheels at the time of off-road driving, that is, at the time when the vehicle travels on an uneven road surface (ground), a rough ground, or the like, for example. In other words, since a road-surface input into one of the right and left wheels is restrained from causing a relative motion between the other one of the right and left wheels and the vehicle body, ride comfort or the like of the vehicle during off-road driving can be maintained successfully.

In the two-cylinder stabilizer device of the above aspect, the first communication passage and the second communication passage extend over a relatively long distance in the vehicle width direction. Accordingly, when the inter-passage communication passage is configured such that respective parts of the first communication passage and the second communication passage that come close to each other communicate with each other via the inter-passage communication passage, the inter-passage communication passage can be made relatively short.

The two-cylinder stabilizer device in the above aspect may include a holder via which a held portion provided in a central part of the stabilizer bar in the vehicle width direction is held by the vehicle body while the stabilizer bar is allowed to turn when one of the right and left wheels performs the bound operation and the other one of the right and left wheels performs the rebound operation. In the two-cylinder stabilizer device of the above aspect, briefly speaking, in the inter-fluid-chamber communication state, the stabilizer bar is allowed to turn such that the supported portions move to the opposite directions in the up-down direction only by the same distance, for example. Particularly, when the cylinder with a rod extending from one side is employed as the cylinder, the pressure receiving area of the piston on which the pressure of hydraulic fluid in the first fluid chamber acts is different from the pressure receiving area on which the pressure of hydraulic fluid in the second fluid chamber acts. Accordingly, such a situation can be assumed that, in the inter-fluid-chamber communication state, the supported portions move to the same direction in the up-down direction, that is, the same-directional movements of the supported portions occur. By providing the holder, it is possible to restrain the same-directional movements of the supported portions. In consideration of simplification, the holder may include a held-portion bush, for example, and may be configured to allow the turning of the stabilizer bar by use of elasticity of the held-portion bush.

As another example of a stabilizer device that can be employed, a one-cylinder stabilizer device can be employed as at least either one of the first stabilizer device and the second stabilizer device, for example. That is, at least either one of the first stabilizer device and the second stabilizer device may be a one-cylinder stabilizer device configured such that opposite ends of the stabilizer bar are connected to one of a pair of wheel holding portions and the vehicle body and supported by the other one of the wheel holding portions and the vehicle body, the wheel holding portions being configured to hold right and left wheels, respectively, and to vertically move relative to the vehicle body together with the wheels thus held. The one-cylinder stabilizer device may include, as the one or more cylinders, one cylinder disposed between the one of the wheel holding portions and the vehicle body and one of the opposite ends of the stabilizer bar, the one cylinder being configured to extend and contract in accordance with a rebound operation of one of the right and left wheels and a bound operation of the other one of the right and left wheels and in accordance with a bound operation of the one of the right and left wheels and a rebound operation of the other one of the right and left wheels such that a volume of one of the two fluid chambers of the one cylinder increases when the one cylinder extends and the volume decreases when the one cylinder contracts, while a volume of the other one of the two fluid chambers decreases when the one cylinder extends and the volume increases when the one cylinder contracts.

In the one-cylinder stabilizer device, when the inter-fluid-chamber shutoff state is established, extension and contraction of the one cylinder are restricted. When the vehicle body rolls, the stabilizer bar is twisted similarly to a normal stabilizer device. Reaction force to the twist acts on the right and left wheels and the vehicle body as roll restraining force, so that the roll of the vehicle body is restrained effectively. In the meantime, when the inter-fluid-chamber communication state is established, relatively free extension and contraction of the cylinder are allowed. Accordingly, it is possible to effectively absorb road-surface inputs into the right and left wheels at the time of off-road driving, for example. Incidentally, the two-cylinder stabilizer device changes presence and absence of a roll restraining effect by use of a pair of cylinders, whereas the one-cylinder stabilizer device changes presence and absence of the vehicle body roll restraining effect by use of only one cylinder. The one-cylinder stabilizer device is a device with a simple structure in that respect.

The one-cylinder stabilizer device may be provided for the right and left wheels suspended by a rigid-axle suspension device. In this case, the stabilizer bar may be supported by an axle housing having opposite ends serving as the wheel holding portions, and the opposite ends of the stabilizer bar may be connected to right and left parts of the vehicle body, respectively. The rigid-axle suspension device has a rigid structure and is therefore suitable for a vehicle that performs off-road driving. Accordingly, when the one-cylinder stabilizer device that can change presence and absence of the roll restraining effect is applied to the wheels suspended by the rigid-axle suspension device, the vehicle can perform off-road driving and also comfortably travel on an ordinary road (a relatively good surface), so that the vehicle exhibits high performance.

Note that, in the stabilizer system of the present disclosure, the two-cylinder stabilizer device can be placed for either one of the front wheels and the rear wheels, and the one-cylinder stabilizer device can be placed for the other one of the front wheels and the rear wheels, for example. Further, the two-cylinder stabilizer device can be placed for both the front wheels and the rear wheels, or the one-cylinder stabilizer device can be placed for both the front wheels and the rear wheels.

In the stabilizer system of the present disclosure, when the first stabilizer device and the second stabilizer device are both brought into the inter-fluid-chamber shutoff state, roll stiffness on a front wheel side may be higher than roll stiffness on a rear wheel side. When the roll stiffness increases, a difference in grounding load between the right and left wheels becomes large. Accordingly, lateral force or cornering force to be generated becomes small. Accordingly, the vehicle provided with the stabilizer system of the aspect has an understeer tendency and exhibits a relatively stable turning behavior. Note that, when the stabilizer system is configured such that, at the time of an electrical failure, either one of the first stabilizer device and the second stabilizer device that is provided for the front wheels exhibits the roll restraining effect, and the other one of the first stabilizer device and the second stabilizer device that is provided for the rear wheels does not exhibit the roll restraining effect, it is possible to achieve a vehicle that exhibits a relatively strong understeer tendency at the time of turning when the electrical failure occurs.

The stabilizer system of the present disclosure may include a controller configured to control the stabilizer system. In this case, the controller may be configured to bring the main stabilizer device into the inter-fluid-chamber communication state in a state where a vehicle provided with the stabilizer system performs off-road driving or a state where the vehicle is planned to perform off-road driving. With such a configuration, a road-surface input is absorbed effectively without the stabilizer bar exhibiting roll restraining force at the time of off-road driving, so that relatively good ride comfort can be achieved during off-road driving. Further, when the vehicle provided with the stabilizer system turns as a necessary condition, the controller may be configured to bring the main stabilizer device into the inter-fluid-chamber shutoff state. With such a configuration, it is possible to effectively restrain roll of the vehicle that is caused due to turning of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart illustrating a stabilizer control program executed by an electronic control unit (ECU) that is a controller for the stabilizer system of the embodiment.

DETAILED DESCRIPTION OF EMBODIMENTS

With reference to the drawings, the following describes details of a stabilizer system for a vehicle according to one embodiment of the present disclosure as a mode for carrying out the present disclosure. Note that the present disclosure can be performed in various modes including various alterations and modifications made based on the knowledge of a person skilled in the art, in addition to the aspects described in SUMMARY as well as the following embodiment.

[A] Configuration of Stabilizer System for Vehicle

Figure 1:
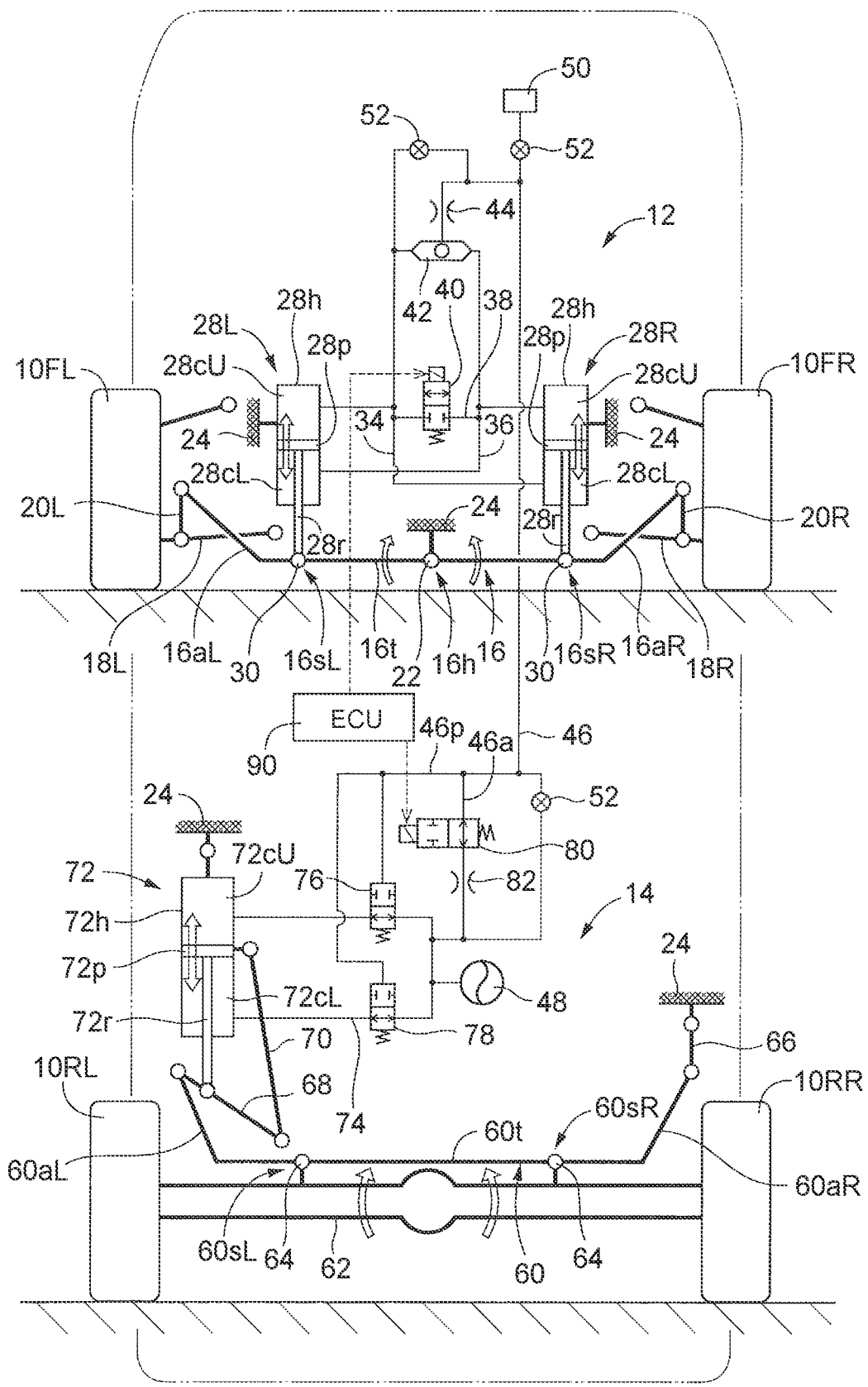
FIG. 1 is a schematic view illustrating a stabilizer system of an embodiment in which a first stabilizer device and a second stabilizer device are placed for front wheels and rear wheels, respectively, as stabilizer devices of the embodiment.

As schematically illustrated in FIG. 1, a stabilizer system according to the embodiment includes: a first stabilizer device 12 provided for right and left front wheels 10FR, 10FL of a vehicle as a stabilizer device of the embodiment; and a second stabilizer device 14 provided for right and left rear wheels 10RR, 10RL of the vehicle. In a case where it is not necessary to distinguish the right and left front wheels 10FR, 10FL from each other and the right and left rear wheels 10RR, 10RL from each other in terms of right and left, the right and left front wheels 10FR, 10FL are referred to as the front wheel 10F, and the right and left rear wheels 10RR, 10RL are referred to as the rear wheel 10R. In a case where it is not necessary to distinguish the right and left front wheels 10F from the right and left rear wheels 10R in terms of front and rear, they are referred to as the wheel 10.

i) First Stabilizer Device

The front wheels 10FR, 10FL are suspended by a double wishbone suspension device that is a suspension device of an independent-suspension type. The first stabilizer device 12 includes a stabilizer bar 16 as a main constituent. The stabilizer bar 16 includes a central torsion bar portion 16$t$ and right and left arm portions 16$a$R, 16$a$L. The torsion bar portion 16$t$ and the right and left arm portions 16$a$R, 16$a$L are integrated with each other. Respective extending directions of the right and left arm portions 16$a$R, 16$a$L intersect with the vehicle width direction that is the extending direction of the torsion bar portion 16$t$. The opposite ends of the stabilizer bar 16, that is, respective distal ends of the right and left arm portions 16$a$R, 16$a$L are connected to right and left lower arms 18R, 18L via link rods 20R, 20L, respectively.

Incidentally, the lower arms 18R, 18L function as a pair of wheel holding portions configured to hold the right and left front wheels 10F and vertically move relative to a vehicle body together with the front wheels 10F thus held. Further, although not illustrated herein, respective second ends of a suspension spring and a shock absorber having first ends supported by a mount portion of the vehicle body are connected to the lower arms 18R, 18L. Note that, in terms of a pair of constituents with reference signs to which subscripts R, L are added, e.g., the arm portions 16$a$R, 16$a$L, the lower arms 18R, 18L, and the like, in a case where it is not necessary to distinguish them from each other in terms of right and left, the arm portions 16$a$R, 16$a$L, the lower arms 18R, 18L, and the like may be referred to as the arm portions 16$a$, the lower arms 18, and the like.

As will be described later in detail, a held portion 16$h$ is provided in the center, in the vehicle width direction, of the torsion bar portion 16$t$ of the stabilizer bar 16, and the held portion 16$h$ of the stabilizer bar 16 is held by a part 24 of the vehicle body (in the figure, the part of the vehicle body is illustrated with hatching) via a holder 22. As illustrated in FIG. 2A, the holder 22 includes a held-portion bush 26. The held-portion bush 26 includes an outer cylinder 26$o$ and a rubber elastic body 26$g$ provided between the outer cylinder 26$o$ and the torsion bar portion 16$t$ of the stabilizer bar 16.

The stabilizer bar 16 is allowed to turn (indicated by blank arrows in FIG. 1) around the held portion 16h. Note that the held-portion bush 26 allows the torsion bar portion 16t of the stabilizer bar 16 to rotate, that is, twist around its axis.

Further, the first stabilizer device 12 includes a pair of cylinders 28R, 28L. In other words, the first stabilizer device 12 is a "two-cylinder stabilizer device" in which the stabilizer bar 16 is supported by the cylinders 28R, 28L. Each of the cylinders 28R, 28L includes a housing 28h, a piston 28p disposed inside the housing 28h, and a piston rod 28r having a base end part connected to the piston 28p and a distal end part (a lower end part) directed downward and extending out from the housing 28h through a fluid chamber. The housing 28h of each of the cylinders 28R, 28L is fixedly connected to a part 24 of the vehicle body. The distal end part of the piston rod 28r of each of the cylinders 28R, 28L is connected, via a support 30, to a corresponding one of a pair of supported portions 16sR, 16sL provided on the right and left sides of the torsion bar portion 16t of the stabilizer bar 16.

Figure 2B:
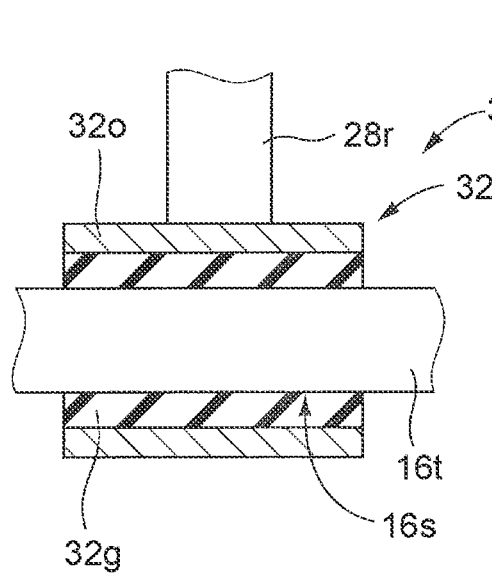
FIG. 2B is a view to describe a structure for a supported portion of the stabilizer bar constituting the first stabilizer device.
Figure 2A:
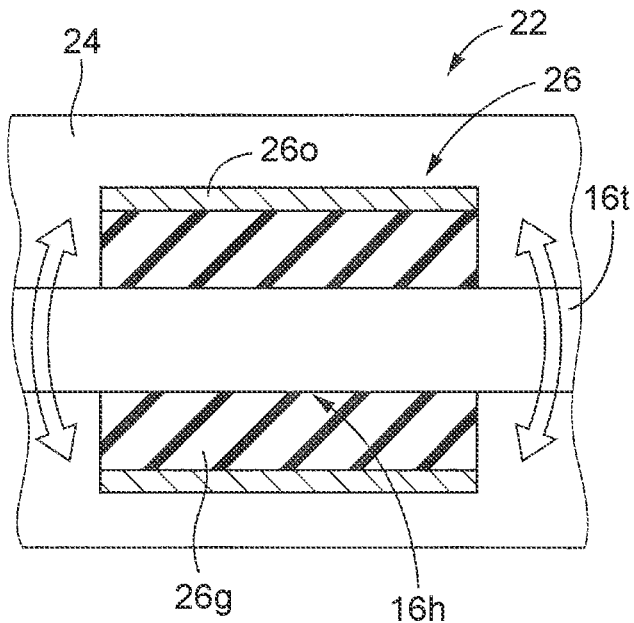
FIG. 2A is a view to describe a structure for a held portion of a stabilizer bar constituting the first stabilizer device.

As illustrated in FIG. 2B, the support 30 includes a supported-portion bush 32. The supported-portion bush 32 includes an outer cylinder 32o and a rubber elastic body 32g provided between the outer cylinder 32o and the torsion bar portion 16t of the stabilizer bar 16. Note that, similarly to the held-portion bush 26, the supported-portion bush 32 allows the torsion bar portion 16t of the stabilizer bar 16 to rotate, that is, twist around its axis.

Incidentally, as understood from the comparison between FIG. 2A and FIG. 2B, the rubber elastic body 26g of the held-portion bush 26 is thicker than the rubber elastic body 32g of the supported-portion bush 32. Since the rubber elastic body 32g and the rubber elastic body 26g are made of the same material, the spring constant of the held-portion bush 26 in the up-down direction is smaller than that of the supported-portion bush 32. That is, briefly speaking, the held-portion bush 26 is softer than the supported-portion bush 32. Accordingly, the stabilizer bar 16 is firmly supported at the supported portions 16sR, 16sL, while the resistance of the stabilizer bar 16 against turning around the held portion 16h is relatively small.

As indicated by blank arrows in FIG. 1, each of the cylinders 28R, 28L is extensible and contractible by the vertical motion of a corresponding one of the supported portions 16sR, 16sL provided on the right and left sides of the torsion bar portion 16t of the stabilizer bar 16. The inside of the housing 28h is sectioned by the piston 28p into two fluid chambers, i.e., an upper chamber 28cU and a lower chamber 28cL, the volumes of which change due to extension and contraction of the piston 28p. More specifically, each of the cylinders 28R, 28L includes: the upper changer 28cU that is a first fluid chamber configured such that its volume increases when the each of the cylinders 28R, 28L extends, that is, its corresponding front wheel 10F performs a rebound operation and the volume decreases when the each of the cylinders 28R, 28L contracts, that is, the corresponding front wheel 10F performs a bound operation; and the lower chamber 28cL that is a second fluid chamber configured such that its volume decreases when the each of the cylinders 28R, 28L extends and the volume increases when the each of the cylinders 28R, 28L contracts.

The first stabilizer device 12 includes a first communication passage 34 via which the upper chamber 28cU of the cylinder 28L communicates with the lower chamber 28cL of the cylinder 28R, and a second communication passage 36 via which the lower chamber 28cL of the cylinder 28L communicates with the upper chamber 28cU of the cylinder 28R. Further, the first stabilizer device 12 includes an inter-passage communication passage 38 via which the first communication passage 34 and the second communication passage 36 communicate with each other. The first stabilizer device 12 further includes an opening-closing valve 40 disposed in the inter-passage communication passage 38. The opening-closing valve 40 is a normally-closed electromagnetic valve that is brought into an open state by being excited, and the opening-closing valve 40 switches the inter-passage communication passage 38 between communication and shutoff. When the opening-closing valve 40 is brought into the open state, an inter-passage communication state where the first communication passage 34 and the second communication passage 36 communicate with each other is established, and when the opening-closing valve 40 is brought into a closed state, an inter-passage non-communication state where the first communication passage 34 and the second communication passage 36 do not communicate with each other is established.

In other words, the first stabilizer device 12 includes the first communication passage 34 and the second communication passage 36 as cross pipes, so that the first stabilizer device 12 includes two hydraulic pressure systems. One of the two hydraulic pressure systems is configured such that the upper chamber 28cU of one of the cylinders 28 is connected to the lower chamber 28cL of the other one of the cylinders 28 via a corresponding cross pipe, and the other one of the two hydraulic pressure systems is configured such that the upper chamber 28cU of the other one of the cylinders 28 is connected to the lower chamber 28cL of the one of the cylinders 28 via a corresponding cross pipe. Further, in terms of mutual communication between these two hydraulic pressure systems, the first stabilizer device 12 includes a switching mechanism including the inter-passage communication passage 38 and the opening-closing valve 40. That is, the first stabilizer device 12 includes a switching mechanism configured to selectively establish the inter-passage communication state and the inter-passage non-communication state.

Moreover, it can be said that the first stabilizer device 12 includes one communication passage via which the upper chamber 28cU and the lower chamber 28cL of each of the cylinders 28 communicate with each other via the first communication passage 34, the second communication passage 36, and the inter-passage communication passage 38. According to this thought, it can be said that, when the opening-closing valve 40 is brought into the open state, an inter-fluid-chamber communication state where the upper chamber 28cU and the lower chamber 28cL communicate with each other in each of the cylinders 28 is established, and when the opening-closing valve 40 is brought into the closed state, an inter-fluid-chamber shutoff state where the upper chamber 28cU and the lower chamber 28cL are shut off from each other in each of the cylinders 28 is established.

As will be described later in detail, each of the cylinders 28R, 28L is a cylinder configured such that its piston rod extends out from the cylinder only from one side, that is, a so-called "cylinder with a rod extending out from one side," and the inner capacity of the housing 28h, that is, the sum of the capacity of the upper chamber 28cU and the capacity of the lower chamber 28cL changes along with extension and contraction of the cylinder. In other words, there is a difference between the outflow-inflow amount of hydraulic fluid in the upper chamber 28cU along with the extension and contraction and the outflow-inflow amount of hydraulic fluid in the lower chamber 28cL. In order to compensate for the difference, that is, volumetric changes of the cylinders 28R, 28L, the first communication passage 34 and the second communication passage 36 are connected to an accumulator 48 provided in the second stabilizer device 14 via a non-electromagnetic shuttle valve 42, an orifice 44, and an inter-device communication passage 46. Further, the first stabilizer device 12 is provided with an injection port 50 from which hydraulic fluid is injected. The injection port 50 is shared by the first stabilizer device 12 and the second stabilizer device 14, and the hydraulic fluid is injected into the second stabilizer device 14 via the inter-device communication passage 46. Note that three valves 52 are normally closed and are to be opened when the hydraulic fluid is injected from the injection port 50.

ii) Second Stabilizer Device

The rear wheels 10RR, 10RL are suspended by a rigid-axle suspension device, and the second stabilizer device 14 is provided for the rear wheels 10RR, 10RL. Similarly to the first stabilizer device 12, the second stabilizer device 14 includes a stabilizer bar 60 as a main constituent. The stabilizer bar 60 of the second stabilizer device 14 includes a central torsion bar portion 60t and right and left arm portions 60aR, 60aL. The torsion bar portion 60t and the right and left arm portions 60aR, 60aL are integrated with each other. Respective extending directions of the right and left arm portions 60aR, 60aL intersect with the vehicle width direction that is the extending direction of the torsion bar portion 60t.

The torsion bar portion 60t of the stabilizer bar 60 is provided with right and left supported portions 60sR, 60sL, and the supported portions 60sR, 60sL of the stabilizer bar 60 are supported by an axle housing 62 via a support 64. The opposite ends of the axle housing 62 function as wheel holding portions that hold the rear wheels 10RR, 10RL, and the axle housing 62 can swing as indicated by blank arrows in FIG. 1 in accordance with vertical motions of the rear wheels 10RR, 10RL relative to the vehicle body. Further, although not illustrated herein, similarly to the support 30 of the first stabilizer device 12 as described earlier, the support 64 includes a supported-portion bush including an outer cylinder and a rubber elastic body and allows the torsion bar portion 60t of the stabilizer bar 60 to rotate, that is, twist around its axis.

The opposite ends of the stabilizer bar 60, that is, respective distal ends of the right and left arm portions 60aR, 60aL are connected to respective parts 24 of the vehicle body, more specifically, parts placed on the right and left sides of the vehicle body in the vehicle width direction. More specifically, the distal end of the right arm portion 60aR is connected via a link rod 66, and the distal end of the left arm portion 60aL is connected via link rods 68, 70, and a cylinder 72. That is, the second stabilizer device 14 is a "one-cylinder stabilizer device" in which one cylinder 72 is employed for connection of the stabilizer bar 60.

Similarly to the cylinder 28 of the first stabilizer device 12, the cylinder 72 includes a housing 72h, a piston 72p disposed inside the housing 72h, and a piston rod 72r having a base end part connected to the piston 72p and a distal end part (a lower end part) directed downward and extending out from the housing 72h through a fluid chamber. The housing 72h is supported by the part 24 of the vehicle body so as to be swingable via a bush. A first end of the link rod 68 is connected to the distal end of the arm portion 60aL, a second end of the link rod 68 is connected to a first end of the link rod 70, and a second end of the link rod 70 is connected to the housing 72h of the cylinder 72. A distal end of the piston rod 72r is connected to an intermediate part of the link rod 68, so that, briefly speaking, the distal end of the piston rod 72r is connected to the distal end of the left arm portion 60aL of the stabilizer bar 60, that is, a first end of the stabilizer bar 60.

As indicated by blank arrows in FIG. 1, the cylinder 72 is extensible and contractible along with swinging of the axle housing 62, that is, a rebound operation and a bound operation of the rear wheel 10RL. Similarly to the cylinder 28 of the first stabilizer device 12, the inside of the housing 70h is sectioned by the piston 72p into two fluid chambers, i.e., an upper chamber 72cU and a lower chamber 72cL, the volumes of which change due to extension and contraction of the piston 72p. More specifically, the cylinder 72 includes: the upper chamber 72cU that is a first fluid chamber configured such that its volume increases when the cylinder 72 extends and the volume decreases when the cylinder 72 contracts; and the lower chamber 72cL that is a second fluid chamber configured such that its volume decreases when the cylinder 72 extends and the volume increases when the cylinder 72 contracts.

The second stabilizer device 14 includes an inter-chamber communication passage 74 via which the upper chamber 72cU and the lower chamber 72cL of the cylinder 72 communicate with each other, and a first opening-closing valve 76 and a second opening-closing valve 78 are disposed in series to each other in the inter-chamber communication passage 74. As will be described later in detail, the first opening-closing valve 76 and the second opening-closing valve 78 are non-electromagnetic pilot valves that operate with the pressure of hydraulic fluid introduced via the inter-device communication passage 46 as a pilot pressure. When the pressure increases to be equal to or higher than a set pressure, the first opening-closing valve 76 and the second opening-closing valve 78 are changed from an open state to a closed state. When the first opening-closing valve 76 and the second opening-closing valve 78 are both in the open state, an inter-fluid-chamber communication state where the upper chamber 72cU and the lower chamber 72cL communicate with each other is established. When the first opening-closing valve 76 and the second opening-closing valve 78 are both in the closed state, an inter-fluid-chamber shutoff state where the upper chamber 72cU and the lower chamber 72cL are shut off from each other is established. In other words, the second stabilizer device 14 includes a switching mechanism including the first opening-closing valve 76 and the second opening-closing valve 78, that is, a switching mechanism configured to selectively establish the inter-fluid-chamber communication state and the inter-fluid-chamber shutoff state.

Note that, as will be described later in detail, similarly to the cylinder 28 of the first stabilizer device 12, the cylinder 72 is a so-called cylinder with a rod extending out from one side, and the inner capacity of the housing 72h, that is, the sum of the capacity of the upper chamber 72cU and the capacity of the lower chamber 72cL changes along with extension and contraction of the cylinder 72. In other words, there is a difference between the outflow-inflow amount of hydraulic fluid in the upper chamber 72cU along with the extension and contraction and the outflow-inflow amount of hydraulic fluid in the lower chamber 72cL. In order to compensate for the difference, that is, a volumetric change of the cylinder 72, the second stabilizer device 14 is configured such that the accumulator 48 described earlier is connected to the inter-chamber communication passage 74 between the first opening-closing valve 76 and the second opening-closing valve 78. The accumulator 48 is further described below. The accumulator 48 functions as both an accumulator necessary for the first stabilizer device 12 and an accumulator necessary for the second stabilizer device 14, and thus, the accumulator 48 is shared by the first stabilizer device 12 and the second stabilizer device 14. As a result, the number of accumulators is reduced in the stabilizer system of the present embodiment. Incidentally, it can be said that, in the stabilizer system of the present embodiment, respective hydraulic pressure systems of the first stabilizer device 12 and the second stabilizer device 14 are integrated by the inter-device communication passage 46 described earlier.

Note that, as described earlier, hydraulic fluid is also injected into the second stabilizer device 14 from the injection port 50 provided in the first stabilizer device 12 via the inter-device communication passage 46. That is, it can be said that the injection port 50 is a single injection portion shared by the first stabilizer device 12 and the second stabilizer device 14, and by use of the injection port 50, injection of hydraulic fluid can be performed easily in the stabilizer system of the present embodiment.

The second stabilizer device 14 is configured such that the torsion bar portion $60t$ of the stabilizer bar 60 is supported by the axle housing 62, and the distal ends of the arm portions $60aR$, $60aL$ are connected to respective parts 24 of the vehicle body. Instead of such a stabilizer device, the stabilizer system of the present embodiment may employ a stabilizer device having a structure in which the torsion bar portion of the stabilizer bar 60 is supported by the vehicle body, and respective distal ends of a pair of arm portions are connected to the opposite ends of the axle housing.

iii) Linkage Mechanism

In the stabilizer system of the present embodiment, the first stabilizer device 12 is provided as a "main stabilizer device," the second stabilizer device 14 is provided as a "following stabilizer device," and the stabilizer system includes a linkage mechanism configured to operate the second stabilizer device 14 in conjunction with the first stabilizer device 12. More specifically, the stabilizer system is provided with a mechanism configured to establish the inter-fluid-chamber shutoff state in the second stabilizer device 14 when the inter-passage non-communication state, that is, the inter-fluid-chamber shutoff state is established in the first stabilizer device 12.

Figure 3A:
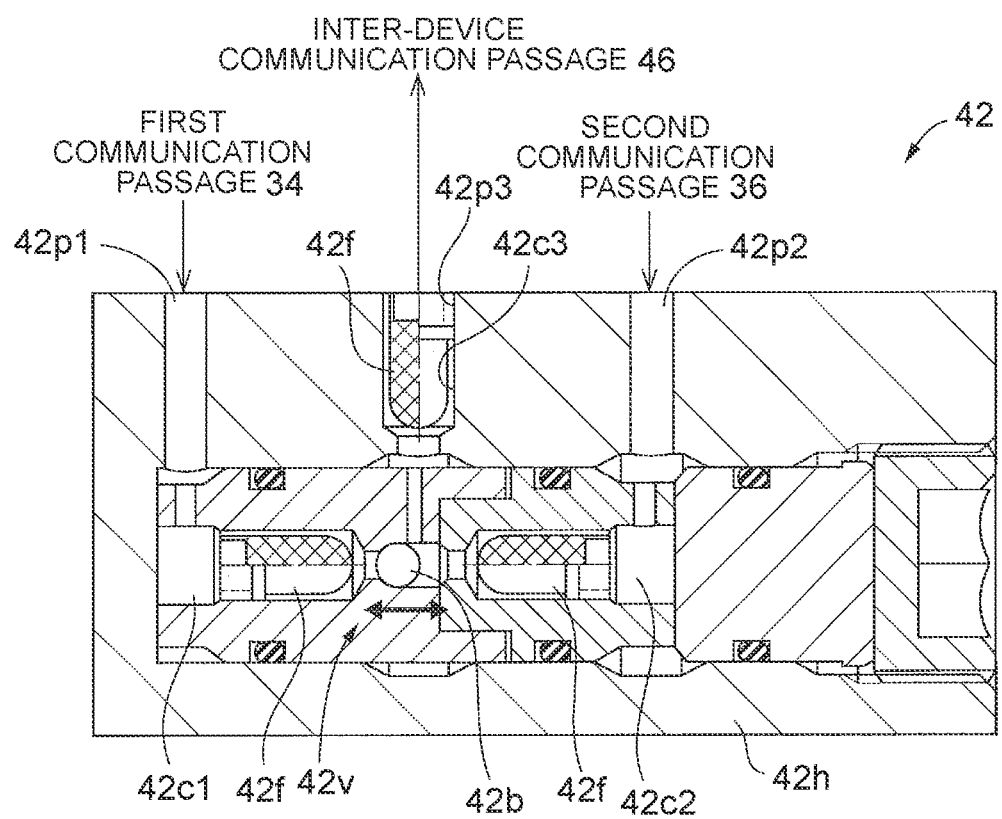
FIG. 3A is a sectional view illustrating a structure of a shuttle valve provided in the first stabilizer device.

More specifically, the shuttle valve 42 provided in the first stabilizer device 12 has a structure illustrated in FIG. 3A and includes: a housing $42h$; three ports $42p1$, $42p2$, $42p3$ formed in the housing $42h$; three fluid chambers $42c1$, $42c2$, $42c3$ formed inside the housing $42h$ and communicating with the ports $42p1$, $42p2$, $42p3$; and a valve mechanism $42v$ selectively connecting the fluid chambers $42c1$, $42c2$, $42c3$ to each other. The port $42p1$ is connected to the first communication passage 34, the port $42p2$ is connected to the second communication passage 36, and the port $42p3$ is connected to the inter-device communication passage 46. The valve mechanism $42v$ includes a valve ball $42b$. The valve ball $42b$ moves right and left by a difference between the pressure of hydraulic fluid in the fluid chamber $42c1$ and the pressure of hydraulic fluid in the fluid chamber $42c2$. When the pressure of hydraulic fluid in the fluid chamber $42c1$ is high, that is, when the pressure of a first hydraulic pressure system including the upper chamber $28cU$ of the cylinder 28L and the lower chamber $28cL$ of the cylinder 28R that are connected to each other via the first communication passage 34 is higher than the pressure of a second hydraulic pressure system including the upper chamber $28cU$ of the cylinder 28R and the lower chamber $28cL$ of the cylinder 28L that are connected to each other via the second communication passage 36, the valve ball $42b$ moves to the right side, so that the first hydraulic pressure system communicates with the inter-device communication passage 46 and the second hydraulic pressure system is shut off from the inter-device communication passage 46. On the other hand, when the pressure of hydraulic fluid in the fluid chamber $42c2$ is high, that is, when the pressure of the second hydraulic pressure system is higher than the pressure of the first hydraulic pressure system, the valve ball $42b$ moves to the left side, so that the second hydraulic pressure system communicates with the inter-device communication passage 46 and the first hydraulic pressure system is shut off from the inter-device communication passage 46. Incidentally, respective filters $42f$ that prevent foreign matter from passing are disposed in the fluid chambers $42c1$, $42c2$, $42c3$ of the shuttle valve 42.

By the operation described above, the shuttle valve 42 functions as a non-electromagnetic selector valve configured to introduce the pressure of one of the two hydraulic pressure systems in the first stabilizer device 12, more specifically, a higher pressure out of the pressures of the upper chamber $28cU$ and the lower chamber $28cL$ in each of the cylinders 28R, 28L into the second stabilizer device 14 via the inter-device communication passage 46. Further, in terms of the function, the inter-device communication passage 46 functions as an introduction passage via which the higher pressure out of the pressures of the upper chamber $28cU$ and the lower chamber $28cL$ of each of the cylinders 28R, 28L of the first stabilizer device 12 is introduced into the second stabilizer device 14.

Figure 3B:
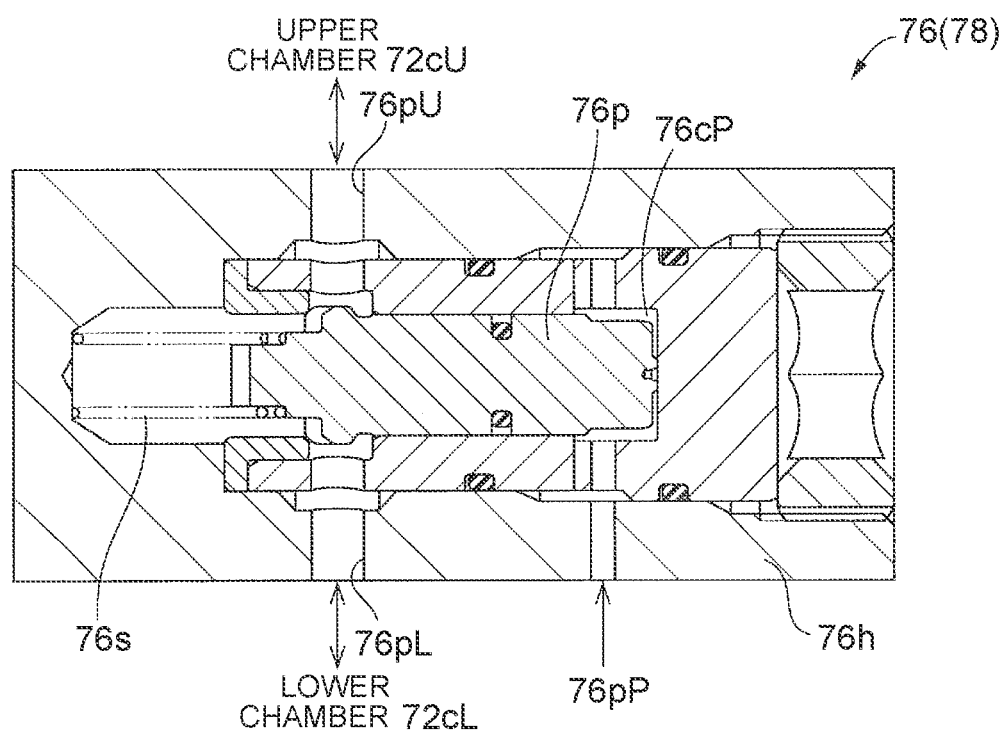
FIG. 3B is a sectional view illustrating a structure of an opening-closing valve provided in the second stabilizer device.

Meanwhile, the first opening-closing valve 76 and the second opening-closing valve 78 provided in the second stabilizer device 14 each have a structure illustrated in FIG. 3B and include: a housing $76h$; a piston $76p$ disposed in the housing $76h$; a pilot pressure chamber $76cP$ formed on a base end side of the piston $76p$; two ports $76pU$, $76pL$ connected to the upper chamber $72cU$ and the lower chamber $72cL$ of the cylinder 72, respectively; and a port $76pP$ via which hydraulic fluid is introduced into the pilot pressure chamber $76cP$. The piston $76p$ is biased by a spring $76s$ toward the base end side, and when the hydraulic pressure introduced from the first stabilizer device 12 via the inter-device communication passage 46 exceeds a set pressure, the piston $76p$ moves to the distal end side, so that the two ports $76pU$, $76pL$ are shut off from each other. That is, the first opening-closing valve 76 and the second opening-closing valve 78 are provided as non-electromagnetic valves configured to operate with the introduced hydraulic pressure as a pilot pressure.

In a state where the two ports $76pU$, $76pL$ in each of the two opening-closing valves 76, 78 communicate with each other, an inter-fluid-chamber communication state where the upper chamber $72cU$ and the lower chamber $72cL$ of the cylinder 72 communicate with each other is established. When the hydraulic pressure introduced from the first stabilizer device 12 exceeds the set pressure such that the two ports $76pU$, $76pL$ in each of the two opening-closing valves 76, 78 are shut off from each other, an inter-fluid-chamber shutoff state where the upper chamber $72cU$ and the lower chamber $72cL$ of the cylinder 72 are shut off from each other is established.

In the first stabilizer device 12 as the main stabilizer device, when the opening-closing valve 40 is brought into the closed state, the inter-fluid-chamber shutoff state is established as described above. As will be described later in detail, when either of the right and left front wheels 10F performs a bound operation or a rebound operation at the time when the inter-fluid-chamber shutoff state is established in the first stabilizer device 12, for example, the hydraulic pressure of either of the first hydraulic pressure system and the second hydraulic pressure system increases. The hydraulic pressure thus increased is introduced into the second stabilizer device 14 as the following stabilizer device via the shuttle valve 42 and the inter-device communication passage 46, and the hydraulic pressure thus introduced works as a pilot pressure for the first opening-closing valve 76 and the second opening-closing valve 78 of the second stabilizer device 14. Due to the action of the pilot pressure, the first opening-closing valve 76 and the second opening-closing valve 78 are brought into the closed state, and the inter-fluid-chamber shutoff state is also established in the second stabilizer device 14. As understood from such an operation, the stabilizer system of the present embodiment includes the shuttle valve 42, the inter-device communication passage 46 as the introduction passage, the first opening-closing valve 76 and the second opening-closing valve 78 as the pilot valves, and so on, and hereby, the linkage mechanism that establishes the inter-fluid-chamber shutoff state in the following stabilizer device when the inter-fluid-chamber shutoff state is established in the main stabilizer device is formed. Incidentally, the orifice 44 provided in the inter-device communication passage 46 so as to be placed on the second stabilizer device 14 side of the shuttle valve 42 is provided to relax a rapid change in the pilot pressure.

Note that the inter-device communication passage 46 branches off into a pilot introduction passage 46p and an accumulator communication passage 46a, and the pilot pressure is introduced into respective ports 76pP of the first opening-closing valve 76 and the second opening-closing valve 78 from the pilot introduction passage 46p. The accumulator communication passage 46a is provided with a shutoff valve 80 that is a normally-opened electromagnetic valve and an orifice 82. In a state where the shutoff valve 80 is not excited, hydraulic fluid from the first stabilizer device 12 flows into the accumulator 48, and no pilot pressure is introduced into the first opening-closing valve 76 and the second opening-closing valve 78. Accordingly, in the stabilizer system of the present embodiment, when the second stabilizer device 14 operates in conjunction with the first stabilizer device 12 as described above, that is, when the first stabilizer device 12 and the second stabilizer device 14 are both brought into the inter-fluid-chamber shutoff state, the shutoff valve 80 is excited and brought into the closed state. Incidentally, the orifice 82 is provided to restrict inflow of hydraulic fluid from the first stabilizer device 12 into the accumulator 48 and outflow of hydraulic fluid from the accumulator 48 to the first stabilizer device 12.

[B] Operation of Stabilizer System

The operation of the stabilizer system of the present embodiment will be described below in terms of the first stabilizer device 12 and the second stabilizer device 14.

i) First Stabilizer Device

Figure 2C:
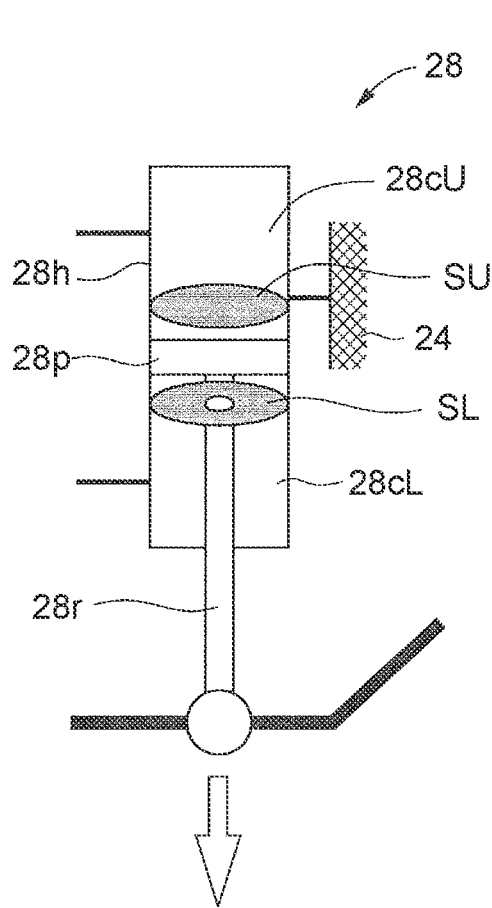
FIG. 2C is a view to describe a structure for a cylinder constituting the first stabilizer device.

As described above, when the opening-closing valve 40 constituting the switching mechanism of the first stabilizer device 12 is brought into the closed state, the inter-passage non-communication state where the first communication passage 34 and the second communication passage 36 do not communicate with each other, that is, the inter-fluid-chamber shutoff state where the upper chamber 28cU and the lower chamber 28cL in each of the cylinders 28R, 28L are shut off from each other is established. As illustrated in FIG. 2C, the cylinder 28 is a so-called "cylinder with a rod extending out from one side," and the piston rod 28r penetrates through the lower chamber 28cL while the piston rod does not penetrate through the upper chamber 28cU. Accordingly, the volume change amount of the upper chamber 28cU due to extension and contraction is different from the volume change amount of the lower chamber 28cL. Accordingly, in the inter-passage non-communication state, that is, in the inter-fluid-chamber shutoff state, inflow and outflow of hydraulic fluid via the first communication passage 34 are not performed between the upper chamber 28cU of the cylinder 28L and the lower chamber 28cL of the cylinder 28R, and inflow and outflow of hydraulic fluid via the second communication passage 36 are not performed between the upper chamber 28cU of the cylinder 28R and the lower chamber 28cL of the cylinder 28L. That is, the cylinders 28R, 28L are both prohibited from extending and contracting.

Figure 4A:
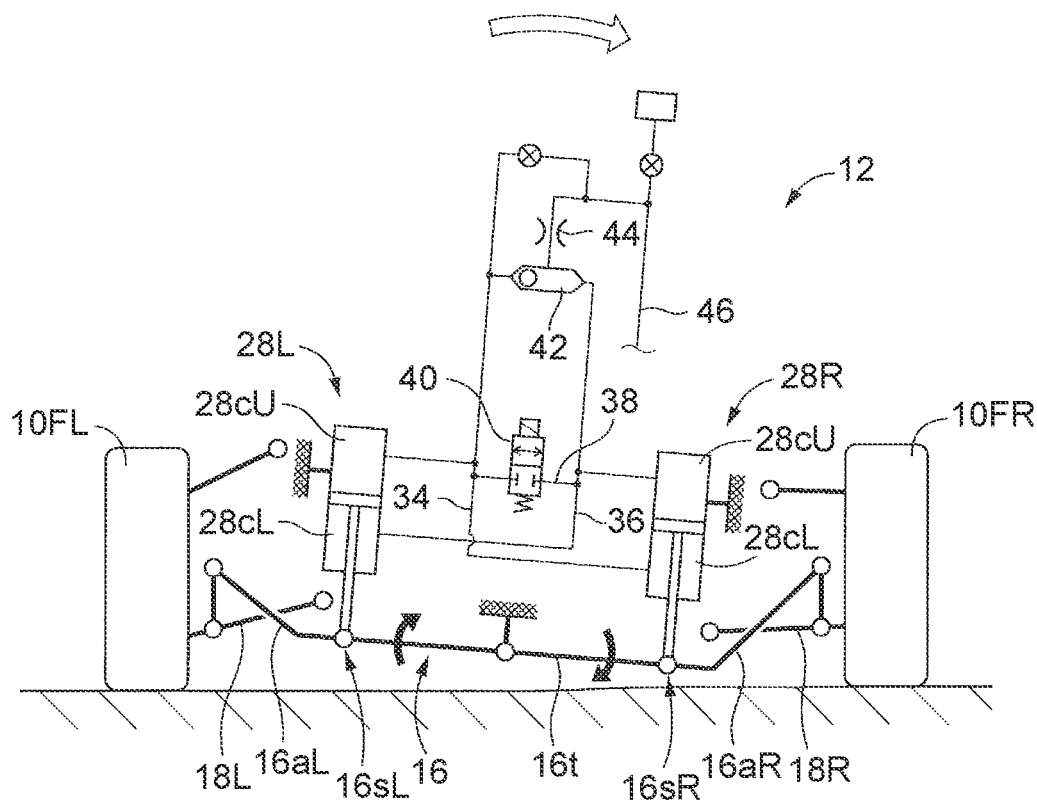
FIG. 4A is a schematic view to describe the operation of the first stabilizer device.

As illustrated in FIG. 4A, when the vehicle turns, the vehicle body inclines, that is, rolls in the right-left direction. FIG. 4A illustrates a state where the vehicle turns to the left side and the vehicle body inclines to the right side. In a state where the cylinders 28R, 28L are prohibited from extending and contracting, the supported portions 16sR, 16sL, of the torsion bar portion 16t of the stabilizer bar 16, that are supported by respective distal ends of the piston rods 28r of the cylinders 28R, 28L are prohibited from vertically moving relative to the vehicle body. Accordingly, the torsion bar portion 16t is twisted. Reaction force to the twist acts on the lower arms 18R, 18L via the right and left arm portions 16aR, 16aL, so that the roll of the vehicle body is restrained. That is, a vehicle body roll restraining effect is achieved.

Figure 4B:
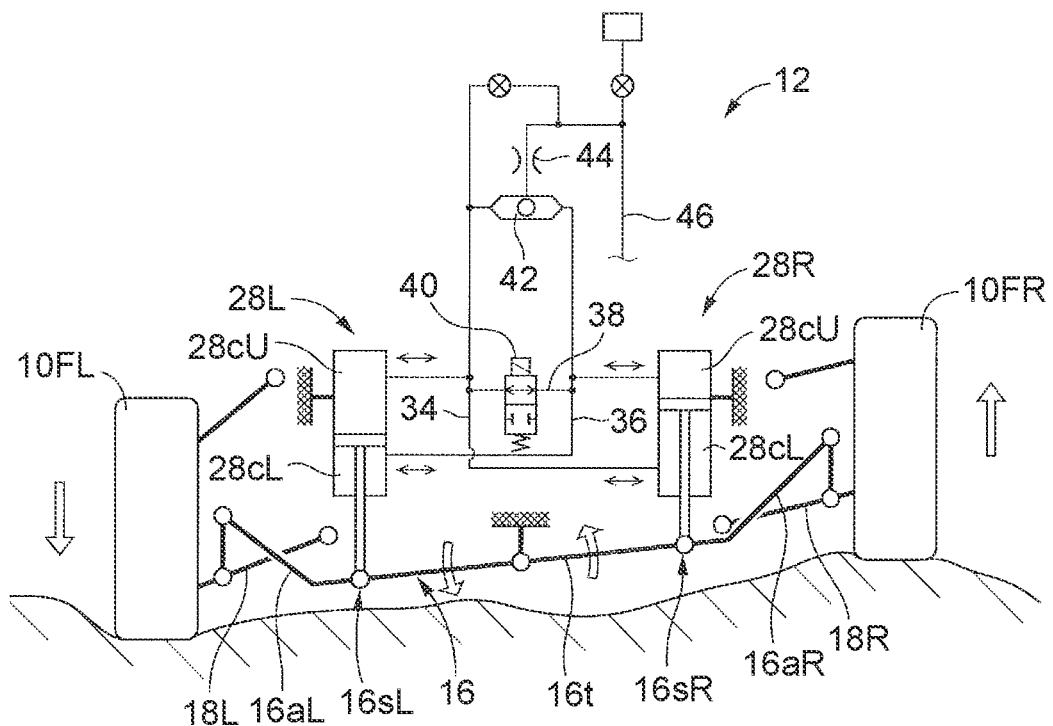
FIG. 4B is a schematic view to describe the operation of the first stabilizer device.

Meanwhile, as illustrated in FIG. 4B, when the opening-closing valve 40 is brought into the open state, the inter-passage communication state where the first communication passage 34 and the second communication passage 36 communicate with each other, that is, the inter-fluid-chamber communication state where the upper chamber 28cU and the lower chamber 28cL in each of the cylinders 28R, 28L communicate with each other is established, so that hydraulic fluid is allowed to generally freely flow in and out of the upper chamber 28cU and the lower chamber 28cL in each of the cylinders 28R, 28L. The cylinders 28R, 28L are allowed to extend and contract with almost no restriction.

Assume a case where external inputs act on the right and left front wheels 10FR, 10FL in a state where the cylinders 28R, 28L are allowed to extend and contract as illustrated in FIG. 4B. Incidentally, FIG. 4B illustrates a case where the vehicle travels on an off-road (rough ground), and the external inputs act such that the left front wheel 10FL performs a rebound operation and the right front wheel 10FR performs a bound operation. In this case, the supported portions 16sR, 16sL of the stabilizer bar 16 are allowed to vertically move relative to the vehicle body, and therefore, the stabilizer bar 16 turns in accordance with the vertical motions (more strictly, relative vertical motions) of the right and left front wheels 10FR, 10FL. More specifically, at the time of the bound operation and the rebound operation of the right and left front wheels 10FR, 10FL, the cylinders 28R, 28L extend and contract, so that the stabilizer bar 16 is allowed to turn. Due to vertical motions of the supported portions 16sR, 16sL of the stabilizer bar 16 along with this turning, the stabilizer bar 16 is hardly twisted. That is, the stabilizer bar 16 does not give force to the lower arms 18R, 18L. That is, the vehicle body roll restraining effect is cancelled. Accordingly, even when the vehicle travels on a rough ground, it is possible to effectively absorb road-surface inputs into the right and left front wheels 10FR, 10FL.

Note that, as described earlier, the cylinder 28 employed in the first stabilizer device 12 is a so-called "cylinder with a rod extending out from one side" as illustrated in FIG. 2C, that is, a cylinder configured such that the piston rod 28r extends out of the cylinder through the lower chamber 28cL that is one of the two fluid chambers. On this account, when a pressure receiving area SU where the pressure of hydraulic fluid in the upper chamber 28cU acts on the piston 28p is compared with a pressure receiving area SL where the pressure of hydraulic fluid in the lower chamber 28cL acts on the piston 28p, the pressure receiving area SU is larger than the pressure receiving area SL. Accordingly, when the pressure of hydraulic fluid in the upper chamber 28cU is equal to the pressure of hydraulic fluid in the lower chamber 28cL, the piston 28p receives force directed downward, so that the cylinder 28 is extended. The extension of the cylinder 28 is sometimes accompanied by a so-called cavitation phenomenon, and this poses a problem particularly when the inter-passage communication state, that is, the inter-fluid-chamber communication state is established. In the first stabilizer device 12 of the present embodiment, the held portion 16h of the stabilizer bar 16 is held by the holder 22, so that the extension caused by the cylinder 28 being a cylinder with a rod extending out from one side is prevented effectively.

Figure 2D:
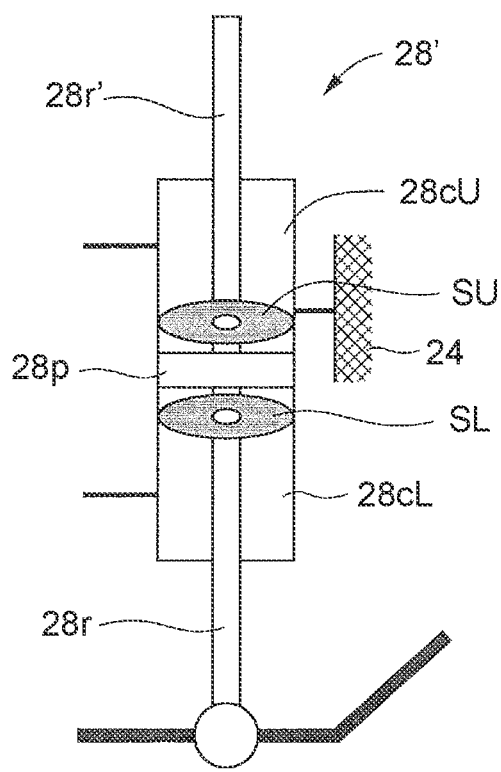
FIG. 2D is a view to describe a structure for a cylinder constituting the first stabilizer device.

Incidentally, instead of the cylinder 28, a cylinder 28' illustrated in FIG. 2D, that is, a so-called "cylinder with a rod extending out from opposite sides" can be employed. In the cylinder 28', the pressure receiving area SL is equal to the pressure receiving area SU, and the cylinder 28' does not extend like the cylinder 28 described above. However, the cylinder 28' has demerits that a complicated structure such as a seal for hydraulic fluid is required and a long disposition space for the cylinder is required. Further, even when the opening-closing valve 40 is brought into the closed state, one of a pair of cylinders 28' is allowed to extend with a given amount while the other one of the cylinders 28' is allowed to contract with the same amount. On this account, in order to effectively prohibit the cylinders 28' from both extending, a special consideration is required. Incidentally, in a case where the cylinder 28' with a rod 28r' extending out from opposite sides is employed, the inner capacity of the housing 28h along with the extension and contraction described above does not change, in other words, a difference between the outflow-inflow amount of hydraulic fluid in the upper chamber 28cU along with the extension and contraction and the outflow-inflow amount of hydraulic fluid in the lower chamber 28cL does not occur. Accordingly, the accumulator 48 can be omitted.

ii) Operation of Second Stabilizer Device

As described earlier, when the first opening-closing valve 76 and the second opening-closing valve 78 constituting the switching mechanism of the second stabilizer device 14 are both brought into the closed state, the inter-fluid-chamber shutoff state where the upper chamber 72cU and the lower chamber 72cL in the cylinder 72 are shut off from each other is established. In this state, hydraulic fluid is prohibited from flowing in and out of the upper chamber 72cU and the lower chamber 72cL, so that the cylinder 72 is prohibited from extending and contracting.

Figure 5A:
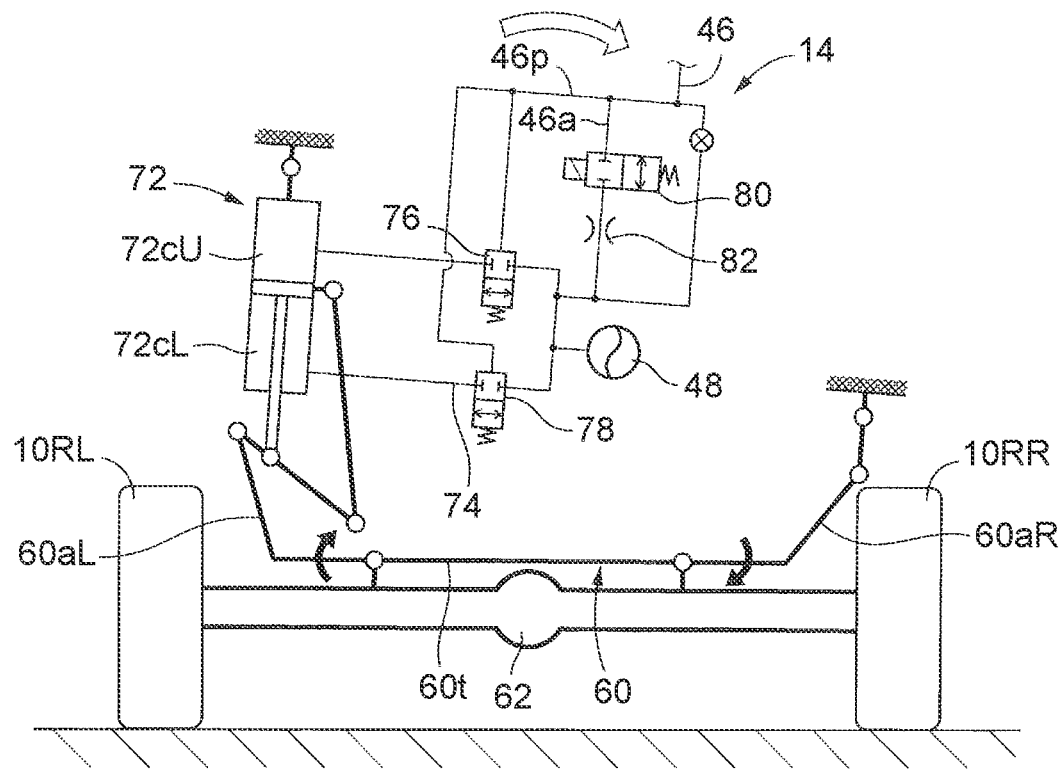
FIG. 5A is a schematic view to describe the operation of the second stabilizer device.

As illustrated in FIG. 5A, when the vehicle turns, the vehicle body inclines, that is, rolls in the right-left direction. Incidentally, FIG. 5A illustrates a state where the vehicle turns to the left side and the vehicle body inclines to the right side. When the vehicle body inclines, the axle housing 62 that supports the torsion bar portion 60t of the stabilizer bar 60 at the supported portions 60sR, 60sL swings relative to the vehicle body. In a state where the cylinder 72 is prohibited from extending and contracting, respective positions, in the up-down direction, of the arms 60aR, 60aL of the stabilizer bar 60 relative to the vehicle body hardly change. Accordingly, the torsion bar portion 60t of the stabilizer bar 60 is twisted by the swinging of the axle housing 62. Reaction force to the twist acts on the parts 24 of the vehicle body via the right and left arm portions 60aR, 60aL and the cylinder 72, so that the roll of the vehicle body is restrained. That is, a vehicle body roll restraining effect is achieved.

Figure 5B:
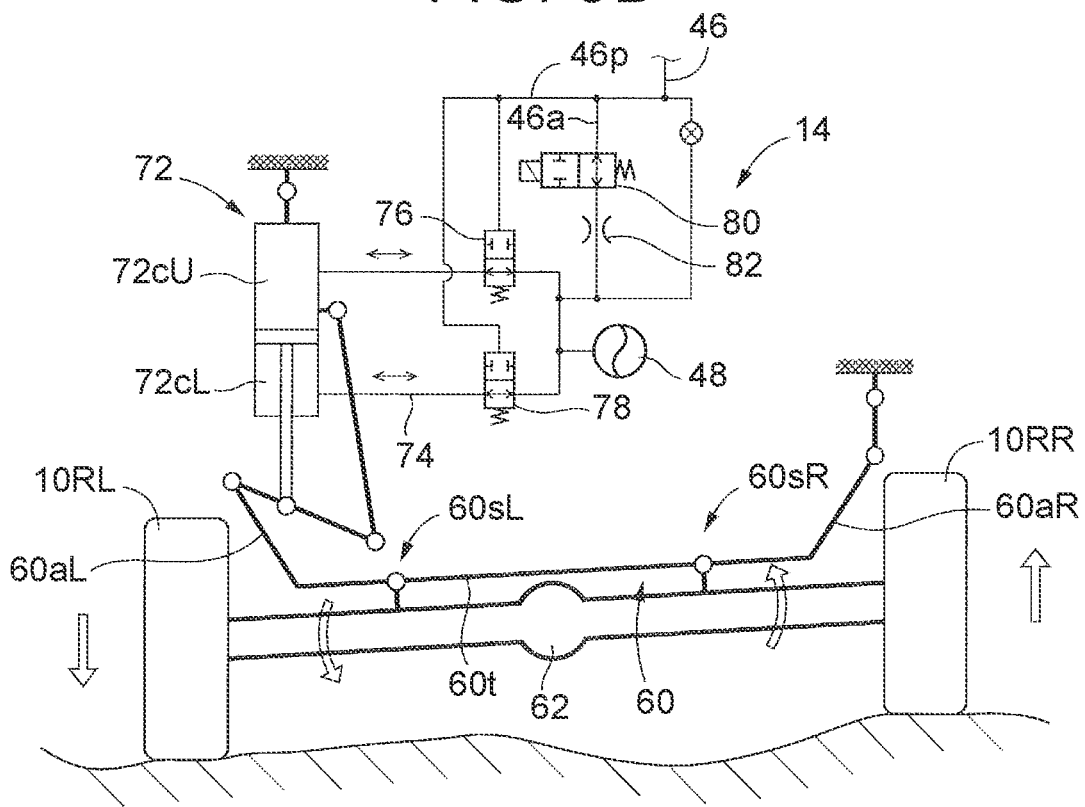
FIG. 5B is a schematic view to describe the operation of the second stabilizer device.

Meanwhile, as illustrated in FIG. 5B, when the first opening-closing valve 76 and the second opening-closing valve 78 are both in the open state, the inter-fluid-chamber communication state where the upper chamber 72cU and the lower chamber 72cL of the cylinder 72 communicate with each other is established, so that hydraulic fluid is allowed to generally freely flow in and out of the upper chamber 72cU and the lower chamber 72cL. The cylinder 72 is allowed to extend and contract with almost no restriction.

Assume a case where external inputs act on the right and left rear wheels 10RR, 10RL in a state where the cylinder 72 is allowed to extend and contract as illustrated in FIG. 5B. Incidentally, FIG. 5B illustrates a case where the external inputs act such that the left rear wheel 10RL performs a rebound operation and the right rear wheel 10RR performs a bound operation on an off-road. In this case, the axle housing 62 swings, and the stabilizer bar 60 supported by the axle housing 62 at the supported portions 60sR, 60sL also swings due to the swinging of the axle housing 62. However, since the cylinder 72 is allowed to extend and contract, the torsion bar portion 60t of the stabilizer bar 60 is hardly twisted by the swinging of the stabilizer bar 60. That is, the stabilizer bar 60 does not give any force to the swinging of the axle housing 62 relative to the vehicle body. That is, the vehicle body roll restraining effect is cancelled. Accordingly, even when the vehicle travels on a rough ground, it is possible to effectively absorb road-surface inputs into the right and left rear wheels 10RR, 10RL.

iii) Roll Stiffness by Stabilizer Device

As described above, when the inter-fluid-chamber shutoff state is established in the first stabilizer device 12, the first stabilizer device 12 achieves the vehicle body roll restraining effect, and when the inter-fluid-chamber shutoff state is established in the second stabilizer device 14, the second stabilizer device 14 achieves the vehicle body roll restraining effect. In terms of how much the vehicle body roll restraining effects are achieved, the first stabilizer device 12 and the second stabilizer device 14 are configured such that, when the first stabilizer device 12 and the second stabilizer device 14 achieve the vehicle body roll restraining effects, the roll stiffness on the front wheel 10F side is higher than the roll stiffness on the rear wheel 10R side. With such a configuration, the vehicle has an understeer tendency and exhibits a stable turning behavior.

iv) Operation During Electrical Failure

When an electrical failure occurs, in other words, when such a failure occurs that electric power cannot be supplied to the opening-closing valve 40 of the first stabilizer device 12 and the shutoff valve 80 of the second stabilizer device 14 that are electromagnetic valves, the opening-closing valve 40 as a normally-closed electromagnetic valve is brought into the closed state, and the shutoff valve 80 as a normally-opened electromagnetic valve is brought into the opened state. As a result, the inter-fluid-chamber shutoff state is established in the first stabilizer device 12, but the pilot pressure from the first stabilizer device 12 via the inter-device communication passage 46 does not work on the first opening-closing valve 76 and the second opening-closing valve 78 of the second stabilizer device 14, so that the second stabilizer device 14 is brought into the inter-fluid-chamber communication state. That is, the vehicle body roll restraining effect is achieved in the first stabilizer device 12 while the vehicle body roll restraining effect of the second stabilizer device 14 is cancelled. Accordingly, the roll stiffness on the front wheel 10F side is high while the roll stiffness on the rear wheel 10R side is low. On this account, the vehicle exhibits an understeer tendency even when such an electrical failure occurs.

Note that, when an electrical failure occurs, the inter-fluid-chamber shutoff state is established in the first stabilizer device 12, but hydraulic fluid is allowed to flow in and out between the cylinders 28R, 28L of the first stabilizer device 12 and the accumulator 48, more specifically, the flow of hydraulic fluid accompanied by resistance of the orifice 44 and the orifice 82 is allowed. Accordingly, the vehicle body roll restraining effect of the first stabilizer device 12 is low in comparison with a case where the shutoff valve 80 of the second stabilizer device 14 is brought into the closed state.

[3] Control on Stabilizer System

The control on the stabilizer system of the present embodiment is executed by a stabilizer electronic control unit (hereinafter also referred to as "ECU", see FIG. 1) 90 that is a controller. More specifically, the ECU 90 executes a current application control on the opening-closing valve 40 of the first stabilizer device 12 and the shutoff valve 80 of the second stabilizer device 14. The ECU 90 includes a computer including a CPU, a ROM, a RAM, and so on and a driving circuit (driver) for the opening-closing valve 40 and the shutoff valve 80 in terms of hardware.

In the stabilizer system of the present embodiment, the ECU 90 switches each of the first stabilizer device 12 and the second stabilizer device 14 between the inter-fluid-chamber communication state and the inter-fluid-chamber shutoff state in accordance with a traveling state of the vehicle.

More specifically, in a latter state out of a state where the vehicle performs off-road driving and a state where the vehicle is planned to perform off-road driving, the inter-fluid-chamber communication state is established in the first stabilizer device 12 by exciting the opening-closing valve 40 such that the opening-closing valve 40 is brought into the open state. Meanwhile, in the second stabilizer device 14, the shutoff valve 80 is not excited so that the shutoff valve 80 is maintained in the open state, and hereby, the first opening-closing valve 76 and the second opening-closing valve 78 are prohibited from entering the closed state. As a result, the second stabilizer device 14 is maintained in the inter-fluid-chamber communication state. That is, the vehicle body roll restraining effects are cancelled on the front wheel 10F side and the rear wheel 10R side.

The vehicle provided with the stabilizer system of the present embodiment is a vehicle suitable for off-road driving, and the mode of a transmission for a driving system is changed by selection of a driver based on whether the vehicle travels on an off-road or an ordinary road. Whether or not the vehicle is planned to perform off-road driving is determined based on whether the mode of the transmission is an off-road driving mode or not. Note that, in a state where the vehicle actually performs off-road driving, both the first stabilizer device 12 and the second stabilizer device 14 may be brought into the inter-fluid-chamber communication state. In this case, whether or not the vehicle is actually traveling on an off-road may be determined based on the degree of a change in a sprung acceleration detected by a sprung acceleration sensor or the like provided in the vehicle body, for example.

In a case where the vehicle is not planned to perform off-road driving, when the degree (e.g., the degree of intensity) of turning of the vehicle exceeds a set degree, the ECU 90 allows the inter-fluid-chamber shutoff state to be established in the first stabilizer device 12 such that the opening-closing valve 40 is not excited so that the opening-closing valve 40 is brought into the closed state, and the ECU 90 allows the inter-fluid-chamber shutoff state to be established in the second stabilizer device 14 such that the shutoff valve 80 is excited and brought into the closed state so as to allow the first opening-closing valve 76 and the second opening-closing valve 78 to enter the closed state by the pilot pressure. Briefly speaking, when the vehicle turns as a necessary condition, the ECU 90 establishes the inter-fluid-chamber shutoff state both in the first stabilizer device 12 and the second stabilizer device 14.

Whether the degree of turning of the vehicle exceeds the set degree or not may be determined based on an operation amount of a steering operating member (an operation angle of a steering wheel), an operation speed of the steering operating member (an operation speed of the steering wheel), a steering amount of wheels, a steering speed of the wheels, a vehicle traveling speed, a lateral acceleration of the vehicle body, a yaw rate of the vehicle, and the like. In the stabilizer system of the present embodiment, it is determined that the degree of turning of the vehicle exceeds the set degree, specifically when either of the following conditions is satisfied: a) a value obtained by dividing a lateral acceleration Gy by an operation amount (an operation angle) θ of the operating member exceeds a threshold A; and b) a change speed (steering speed) dθ of the operation amount θ of the operating member exceeds a threshold speed B.

More specifically, the control on the stabilizer system of the present embodiment is performed such that the ECU 90 repeatedly executes a stabilizer control program illustrated in the flowchart of FIG. 6 in a short time pitch (e.g., every few milliseconds to every few tens of milliseconds). The following briefly describes a process in accordance with the program.

In the process in accordance with the stabilizer control program, first, in S1, the ECU 90 determines whether or not the mode of the transmission is the off-road driving mode. When the mode is the off-road driving mode, S2 is executed such that the inter-fluid-chamber communication state is established in the first stabilizer device 12 by exciting the opening-closing valve 40 so that the opening-closing valve 40 is brought into the open state, and the inter-fluid-chamber communication state is established in the second stabilizer device 14 such that the shutoff valve 80 is not excited and is maintained in the open state so that the first opening-closing valve 76 and the second opening-closing valve 78 are maintained in the open state.

When the ECU 90 determines in S1 that the mode is not the off-road driving mode, a turning degree specifying process of S3 is executed. More specifically, the lateral acceleration Gy, the operation amount θ of the operating member, and the steering speed dθ are specified. Subsequently, in S4, the ECU 90 determines whether or not the value obtained by dividing the lateral acceleration Gy by the operation amount θ of the operating member exceeds the threshold A, and then, in S5, the ECU 90 determines whether or not the steering speed dθ exceeds the threshold speed B. In a case where at least either one of the condition that the value obtained by dividing the lateral acceleration Gy by the operation amount θ of the operating member exceeds the threshold A and the condition that the steering speed dθ exceeds the threshold speed B is satisfied, S6 is executed as follows: the inter-fluid-chamber shutoff state is established in the first stabilizer device 12 such that the opening-closing valve 40 is not excited and is maintained in the closed state; and the inter-fluid-chamber shutoff state is established in the second stabilizer device 14 such that the shutoff valve 80 is excited and brought into the closed state so as to allow the first opening-closing valve 76 and the second opening-closing valve 78 to enter the closed state by the plot pressure. When either of the conditions in S4, S5 is not satisfied, S2 is executed as follows: the inter-fluid-chamber communication state is established in the first stabilizer device 12 such that the opening-closing valve 40 is excited and brought into the open state; and the inter-fluid-chamber communication state is established in the second stabilizer device 14 such that the shutoff valve 80 is not excited and is maintained in the open state so that the first opening-closing valve 76 and the second opening-closing valve 78 are maintained in the open state.

What is claimed is:

1. A stabilizer system for a vehicle, the stabilizer system comprising:
    a first stabilizer device provided for either one of front wheels and rear wheels; and
    a second stabilizer device provided for the other one of the front wheels and the rear wheels, wherein:
    each of the first stabilizer device and the second stabilizer device includes
        (a) a stabilizer bar extending in a right-left direction,
        (b) one or more cylinders each including a housing and a piston by which the housing is sectioned into two fluid chambers, the one or more cylinders being disposed between the stabilizer bar and a corresponding one of the wheels or between the stabilizer bar and a vehicle body in an extensible and contractible manner,
        (c) a communication passage via which the two fluid chambers of each of the one or more cylinders are connected to each other, and
        (d) an opening-closing valve disposed in the communication passage and configured to selectively establish an inter-fluid-chamber communication state where the two fluid chambers communicate with each other and an inter-fluid-chamber shutoff state where the two fluid chambers are shut off from each other;
    the first stabilizer device and the second stabilizer device are each configured such that a vehicle body roll restraining effect is achieved in the inter-fluid-chamber shutoff state, and the vehicle body roll restraining effect is cancelled in the inter-fluid-chamber communication state; and
    the stabilizer system includes a linkage mechanism configured to, when the inter-fluid-chamber shutoff state is established in a main stabilizer device, establish the inter-fluid-chamber shutoff state in a following stabilizer device, the main stabilizer device being one of the first stabilizer device and the second stabilizer device, the following stabilizer device being the other one of the first stabilizer device and the second stabilizer device,
    wherein, when the first stabilizer device and the second stabilizer device are both brought into the inter-fluid-chamber shutoff state, roll stiffness on a front wheel side is higher than roll stiffness on a rear wheel side.

2. The stabilizer system according to claim 1, wherein the linkage mechanism is configured such that:
    the opening-closing valve of the main stabilizer device is an electrically controllable electromagnetic valve;
    the stabilizer system includes an introduction passage via which a hydraulic pressure of one of the two fluid chambers of each of the one or more cylinders of the main stabilizer device is introduced into the following stabilizer device; and
    the opening-closing valve of the following stabilizer device is a non-electromagnetic valve configured to operate by using, as a pilot pressure, the hydraulic pressure introduced via the introduction passage.

3. The stabilizer system according to claim 2, wherein the linkage mechanism includes a non-electromagnetic selector valve by which a higher hydraulic pressure out of respective hydraulic pressures of the two fluid chambers of each of the one or more cylinders of the main stabilizer device is introduced into the following stabilizer device.

4. The stabilizer system according to claim 2, wherein the opening-closing valve of the main stabilizer device is a normally-closed electromagnetic valve configured to be brought into an open state by being excited.

5. The stabilizer system according to claim 2, wherein:
    the one or more cylinders of either of the first stabilizer device and the second stabilizer device each include a piston rod having a base end part connected to the piston and a distal end part extending out of the housing through one of the two fluid chambers; and
    the housing is connected to either of the stabilizer bar and a corresponding one of the wheels or the vehicle body, and the distal end part of the piston rod is connected to the other one of the stabilizer bar and the corresponding one of the wheels or the vehicle body.

6. The stabilizer system according to claim 5, comprising an accumulator connected to both the communication passage of the first stabilizer device and the communication passage of the second stabilizer device so that the one or more cylinders of either of the first stabilizer device and the second stabilizer device are each extensible and contractible in the inter-fluid-chamber communication state.

7. The stabilizer system according to claim 6, wherein at least either one of the communication passage of the first stabilizer device and the communication passage of the second stabilizer device is connected to the accumulator via the introduction passage.

8. The stabilizer system according to claim 6, comprising a shutoff valve configured to close the accumulator when the first stabilizer device and the second stabilizer device are both brought into the inter-fluid-chamber shutoff state.

9. The stabilizer system according to claim 8, wherein the shutoff valve is an electrically controllable electromagnetic valve.

10. The stabilizer system according to claim 9, wherein the shutoff valve is a normally-opened electromagnetic valve that is brought into a closed state by being excited.

11. The stabilizer system according to claim 1, wherein at least either one of the first stabilizer device and the second stabilizer device is a two-cylinder stabilizer device configured such that:
    opposite ends of the stabilizer bar are connected to a pair of wheel holding portions, respectively, the wheel holding portions being configured to hold right and left wheels, respectively, and vertically move relative to the vehicle body together with the wheels thus held;
    the two-cylinder stabilizer device includes, as the one or more cylinders, a pair of cylinders each disposed between a corresponding one of a pair of supported portions and the vehicle body such that the supported portions of the stabilizer bar are supported by the vehicle body, the supported portions being provided in right and left parts of the stabilizer bar, respectively, each of the pair of the cylinders being configured to extend and contract in accordance with a rebound operation and a bound operation of a corresponding wheel out of the right and left wheels relative to the vehicle body such that
- a volume of a first fluid chamber as one of the two fluid chambers of the each of the pair of the cylinders increases at a time of the rebound operation of the corresponding wheel while the volume of the first fluid chamber decreases at a time of the bound operation of the corresponding wheel, and
- a volume of a second fluid chamber as the other one of the two fluid chambers of the each of the pair of the cylinders decreases at the time of the rebound operation of the corresponding wheel while the volume of the second fluid chamber increases at the time of the bound operation of the corresponding wheel;

the communication passage includes
- a first communication passage via which the first fluid chamber of one of the pair of the cylinders communicates with the second fluid chamber of the other one of the pair of the cylinders,
- a second communication passage via which the second fluid chamber of the one of the pair of the cylinders communicates with the first fluid chamber of the other one of the pair of the cylinders, and
- an inter-passage commutation passage via which the first communication passage and the second communication passage communicate with each other; and the opening-closing valve is disposed in the inter-passage communication passage.

12. The stabilizer system according to claim 11, wherein the two-cylinder stabilizer device includes a holder via which a held portion provided in a central part of the stabilizer bar in a vehicle width direction is held by the vehicle body while the stabilizer bar is allowed to turn when one of the right and left wheels performs the bound operation and the other one of the right and left wheels performs the rebound operation.

13. The stabilizer system according to claim 1, wherein:
at least either one of the first stabilizer device and the second stabilizer device is a one-cylinder stabilizer device configured such that opposite ends of the stabilizer bar are connected to one of a pair of wheel holding portions and the vehicle body and supported by the other one of the wheel holding portions and the vehicle body, the wheel holding portions being configured to hold right and left wheels, respectively, and to vertically move relative to the vehicle body together with the wheels thus held; and the one-cylinder stabilizer device includes, as the one or more cylinders, one cylinder disposed between the one of the wheel holding portions and the vehicle body and one of the opposite ends of the stabilizer bar, the one cylinder being configured to extend and contract in accordance with a rebound operation of one of the right and left wheels and a bound operation of the other one of the right and left wheels and in accordance with a bound operation of the one of the right and left wheels and a rebound operation of the other one of the right and left wheels such that a volume of one of the two fluid chambers of the one cylinder increases when the one cylinder extends and the volume decreases when the one cylinder contracts, while a volume of the other one of the two fluid chambers decreases when the one cylinder extends and the volume increases when the one cylinder contracts.

14. The stabilizer system according to claim 13, wherein the one-cylinder stabilizer device is provided for the right and left wheels suspended by a rigid-axle suspension device.

15. The stabilizer system according to claim 14, wherein the one-cylinder stabilizer device is configured such that
the stabilizer bar is supported by an axle housing having opposite ends serving as the wheel holding portions, and
the opposite ends of the stabilizer bar are connected to right and left parts of the vehicle body, respectively.

16. The stabilizer system according to claim 1, comprising a controller configured to control the stabilizer system.

17. The stabilizer system according to claim 16, wherein the controller is configured to bring the main stabilizer device into the inter-fluid-chamber communication state in a state where a vehicle provided with the stabilizer system performs off-road driving or a state where the vehicle is planned to perform off-road driving.

18. The stabilizer system according to claim 16, wherein, when the vehicle provided with the stabilizer system turns as a necessary condition, the controller is configured to bring the main stabilizer device into the inter-fluid-chamber shut-off state.

* * * * *